United States Patent
Hamel et al.

(10) Patent No.: US 11,870,898 B2
(45) Date of Patent: Jan. 9, 2024

(54) SPLIT KEYS FOR WALLET RECOVERY

(71) Applicant: Workday, Inc., Pleasanton, CA (US)

(72) Inventors: Bjorn Hamel, Dublin, CA (US);
Prakash Sundaresan, Redmond, WA (US)

(73) Assignee: Workday, Inc., Pleasanton, CA (US)

( * ) Notice: Subject to any disclaimer, the term of this patent is extended or adjusted under 35 U.S.C. 154(b) by 215 days.

(21) Appl. No.: 16/880,149

(22) Filed: May 21, 2020

(65) Prior Publication Data

US 2021/0367778 A1 Nov. 25, 2021

(51) Int. Cl.
| | |
|---|---|
| *H04L 9/08* | (2006.01) |
| *G06Q 30/018* | (2023.01) |
| *G06Q 10/105* | (2023.01) |
| *H04L 9/32* | (2006.01) |
| *H04L 9/30* | (2006.01) |
| *G06F 16/27* | (2019.01) |
| *H04L 101/37* | (2022.01) |

(52) U.S. Cl.
CPC ............ *H04L 9/0894* (2013.01); *G06F 16/27* (2019.01); *G06Q 10/105* (2013.01); *G06Q 30/0185* (2013.01); *H04L 9/085* (2013.01); *H04L 9/30* (2013.01); *H04L 9/3213* (2013.01); *H04L 2101/37* (2022.05)

(58) Field of Classification Search
None
See application file for complete search history.

(56) References Cited

U.S. PATENT DOCUMENTS

| | | | | |
|---|---|---|---|---|
| 5,796,830 A | * | 8/1998 | Johnson | H04L 9/0894 380/277 |
| 10,439,812 B2 | * | 10/2019 | Patin | H04L 9/0869 |
| 10,516,527 B1 | * | 12/2019 | Machani | H04L 9/0625 |
| 11,057,210 B1 | * | 7/2021 | Sierra | H04L 9/3226 |
| 2003/0081785 A1 | * | 5/2003 | Boneh | H04L 9/3073 380/277 |
| 2010/0318782 A1 | | 12/2010 | Auradkar | |
| 2014/0337221 A1 | | 11/2014 | Hoyos | |
| 2015/0186634 A1 | | 7/2015 | Crandell | |
| 2015/0242616 A1 | * | 8/2015 | Oprea | G06F 21/445 726/1 |

(Continued)

FOREIGN PATENT DOCUMENTS

| | | | | |
|---|---|---|---|---|
| WO | WO-2018231832 A1 | * | 12/2018 | ........... G06Q 20/367 |
| WO | 2019191215 | | 10/2019 | |

*Primary Examiner* — Saleh Najjar
*Assistant Examiner* — Shadi H Kobrosli
(74) *Attorney, Agent, or Firm* — Van Pelt, Yi & James LLP (57) ABSTRACT

A system for split keys for wallet recovery includes an interface configured to receive a request to recover a user private key, and a processor configured to provide a request to a credential issuing authority for a first encrypted recovery key share, wherein the request includes a first identification credential, receive the first encrypted recovery key share from the credential issuing authority, provide a request to a trusted organization for a second encrypted recovery key share, wherein the request includes a second identification credential, receive the second encrypted recovery key share from the trusted organization, combine the first encrypted recovery key share and the second encrypted recovery key share to determine a recovered encryption key, and determine the user private key using the recovered encryption key.

17 Claims, 9 Drawing Sheets

(56) References Cited

U.S. PATENT DOCUMENTS

| | | | | |
|---|---|---|---|---|
| 2015/0254463 | A1* | 9/2015 | Ryhorchuk | H04L 9/3247 |
| | | | | 713/176 |
| 2016/0112193 | A1 | 4/2016 | Li | |
| 2017/0083718 | A1 | 3/2017 | Peddada | |
| 2018/0375653 | A1* | 12/2018 | Setty | H04L 9/3218 |
| 2019/0230092 | A1 | 7/2019 | Patel | |
| 2019/0245688 | A1 | 8/2019 | Patin | |
| 2020/0153627 | A1* | 5/2020 | Wentz | G06F 21/6218 |
| 2020/0389306 | A1* | 12/2020 | Dolan | H04L 9/3066 |
| 2021/0234678 | A1 | 7/2021 | Armleder | |
| 2021/0375409 | A1 | 12/2021 | Romantsov | |
| 2022/0078005 | A1* | 3/2022 | Lanc | H04L 63/10 |
| 2022/0321340 | A1* | 10/2022 | Tsitrin | H04L 9/3234 |

* cited by examiner

SPLIT KEYS FOR WALLET RECOVERY

BACKGROUND OF THE INVENTION

A database system distributes cryptographic digital credentials to a user to allow the user to prove qualifications (e.g., a degree, employment experience, health insurance coverage, etc.). Credentials can be assigned to a user by a trusted third party client of the database system (e.g., a university, an employer, an insurer). Typically credentials are accessed using a user private key stored on a user device. In the event the user private key is lost (e.g., as a result of loss or damage to the user device) and a password-encrypted backup copy of the user private key is inaccessible (e.g., in the event the password is forgotten), there is no way to recover the user private key, creating a problem where the digital credentials are permanently inaccessible.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for split keys for wallet recovery is disclosed. The system for key recovery comprises an interface configured to receive a request to recover a user private key, and a processor configured to provide a request to a credential issuing authority for a first encrypted recovery key share, wherein the request includes a first identification credential, receive the first encrypted recovery key share from the credential issuing authority, provide a request to a trusted organization for a second encrypted recovery key share, wherein the request includes a second identification credential, receive the second encrypted recovery key share from the trusted organization, combine the first encrypted recovery key share and the second encrypted recovery key share to determine a recovered encryption key, and determine the user private key using the recovered encryption key.

A system for key storage comprises an interface configured to receive an indication to create a credential issuing authority encrypted recovery encryption key share and a trusted organization encrypted recovery encryption key share, and a processor configured to create two recovery encryption key shares based at least in part on a recovery encryption key, determine a credential issuing authority public key associated with a credential issuing authority, encrypt a first recovery encryption key share using the credential issuing authority public key to generate a credential issuing authority encrypted recovery encryption key share, provide the credential issuing authority encrypted recovery encryption key share to the credential issuing authority, determine a trusted organization and an associated trusted organization public key, encrypt a second recovery encryption key share using the trusted organization public key to generate a trusted organization encrypted recovery encryption key share, provide the trusted organization encrypted recovery encryption key share to the trusted organization.

A system for key storage and recovery comprises a system for storing a recovery encryption key divided into two separate shares and stored on two separate systems (e.g., a split key are two parts of a secret of Shamir's Secret Sharing Scheme). The recovery encryption key comprises an encryption key used for encrypting and later decrypting a backup copy of a user private key for a user of a credential system. The user private key is for the control of the identity of the user. Upon receiving a request to create and store a user private key (e.g., upon initialization of the credential system), the system creates a user private key and a recovery encryption key, and determines an encrypted user private key by encrypting the user private key with the recovery encryption key. The encrypted user private key is then provided to and stored by a credential issuing authority. In order to store the recovery encryption key in a way that no entity other than the original user is able to access it, the system divides the recovery encryption key into two shares. A first share is encrypted with a credential issuing authority public key and provided to the credential issuing authority for storage, and a second share is encrypted with a trusted organization public key, and provided to the trusted organization for storage. For example, the trusted organization comprises an employer, a university, etc.

In order to create a mechanism for authenticating access to the recovery encryption key shares, the system creates an identifier document, signs the identifier document with a user private key, and provides the signed identifier document for storage to the credential issuing authority. The system then captures an image of a user identification (e.g., a driver's license image) as well as an image of the user (e.g., a "selfie") and provides the user identification image, the user image, and a public key associated with the identifier document to an identity validation service. An identity validation credential is received from the identity validation service, bound to the user identity. The identity validation credential is provided to the credential issuing authority and to the trusted organization for use in validating the user identity when the encrypted recovery encryption key share is requested.

A system for key storage and recovery additionally comprises a system for recovering a recovery encryption key divided into two separate shares and stored on two separate systems. The system receives a request to recover a user private key, associated with an email address associated with the requesting user. The system provides the email address to the credential issuing authority and receives in return an identifier document and an associated identifier document public key. A proof of control request to the identity validation service is made upon recovery encryption key storage (e.g., proof of control of underlying identity document(s) by proof of possession of an identifier and a selfie). The system captures an image of a user identification and an image of the user, and provides the user identification image, the user image, and the identifier document public key to the identity validation service. An identity validation credential is received from the identity validation service. The system then provides a request to the credential issuing authority for a recovery encryption key share. The request is associated with the identity validation credential received from the identity validation service. The credential issuing authority compares the identity validation credential to a stored identity validation credential associated with the same identifier document, and in the event it is determined that the identity validation credentials match, the credential issuing authority decrypts its recovery encryption key share and provides it to the system. The credential issuing authority additionally provides an encrypted key request token to the system for requesting the encrypted backup copy user private key stored by the credential issuing authority. The system additionally provides a request to the credential issuing authority for an indication of a trusted organization (e.g., the trusted organization storing the other recovery encryption key share).

The system then provides a request to the trusted organization for a recovery encryption key share. The request is associated with the identity validation credential received from the identity validation service. The trusted organization compares the identity validation credential to a stored identity validation credential associated with the same identifier document, and in the event it is determined that the identity validation credentials match, the trusted organization can provide additional identity validation checks. For example, the trusted organization queries the user regarding the last two digits of the last two paychecks of the user, a most recent performance rating for the user, or a number of coworkers on a team for the user. In the event the additional identity validation checks are satisfied, the trusted organization decrypts its recovery encryption key share and provides it to the system. The system then combines the two recovery encryption key shares to determine the recovery encryption key. The system requests the encrypted backup copy user private key from the credential issuing authority using the encrypted key request token, and decrypts the encrypted private key locally in the system using the recovery encryption key. In order to store the user private key securely, the system finally encrypts the user private key with a local encryption key. In some embodiments, the local encryption key comprises a hardware based key.

The system for key storage and recovery improves the computer system by providing a secure way of storing a user private key backup inaccessible to any user or system other than the creating user. The process of dividing the recovery key into two shares and storing the two shares on separate trusted systems ensures that no system has access to the recovery key, and only a user able to pass the identity validation checks can gain access to the recovery key. Thus, in the event that the user device storing the user private key is lost, damaged, stolen, data corrupted, etc., the user private key can be recovered and the certificates do not need to be recreated.

Figure 1:
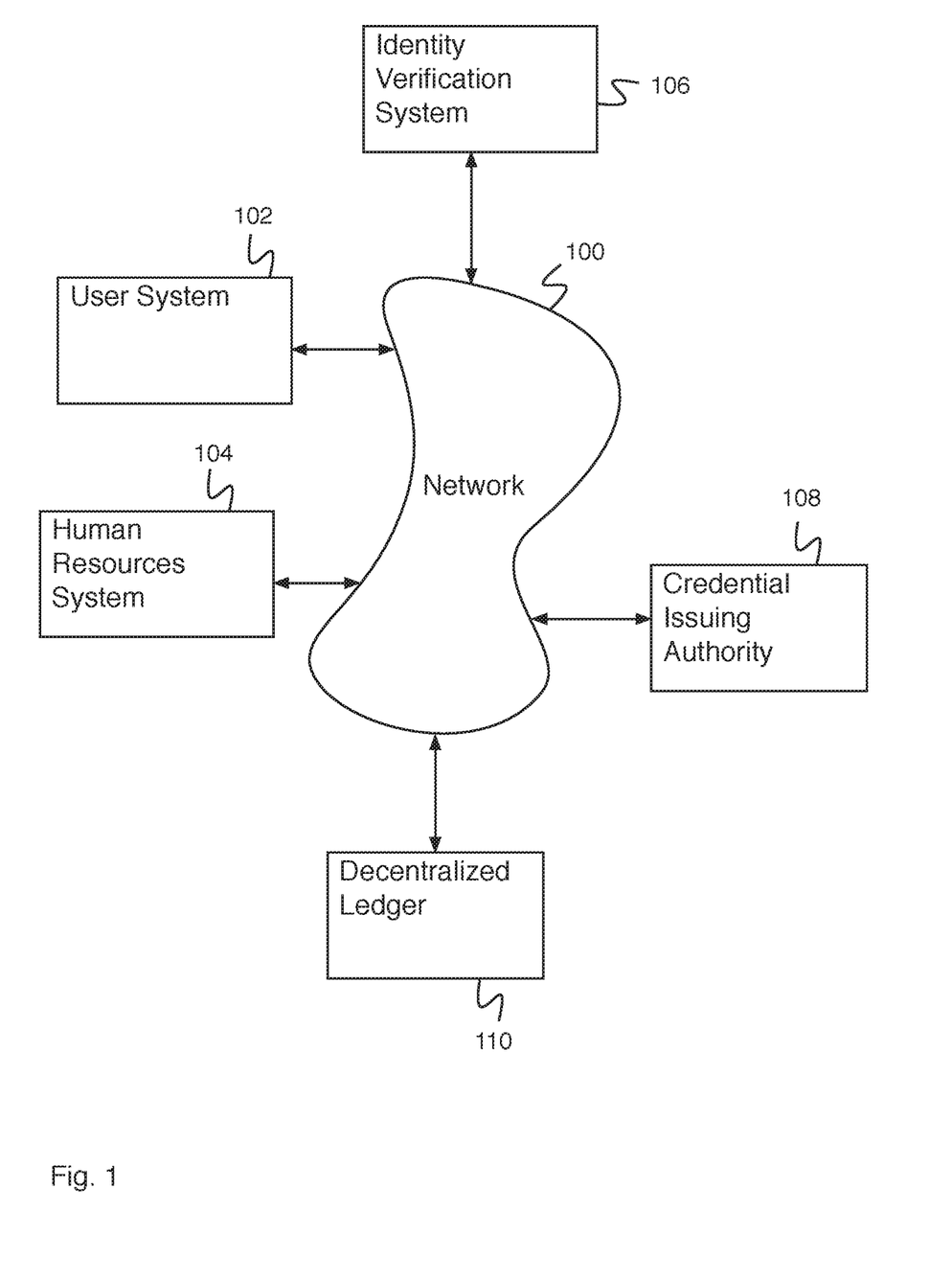
FIG. 1 is a block diagram illustrating an embodiment of a network system.

FIG. 1 is a block diagram illustrating an embodiment of a network system. In some embodiments, the network system of FIG. 1 comprises a network system for a system for key storage and recovery. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, human resources system 104, identity verification system 106, credential issuing authority 108, and decentralized ledger 110 communicate via network 100.

User system 102 comprises a user system for use by a user. For example, user system 102 comprises a system for communication, data access, computation, etc. User system 102 comprises a credential wallet for proving credential information. For example, credential information comprises information describing a college degree, employment tenure, years lived at a residence, medical insurance, etc. The credential wallet stores and/or accesses credentials issued by credential issuing authority 108 for proving credential information. User system 102 comprises a system for key storage and recovery. For example, user system 102 comprises a system for key recovery, comprising an interface configured to receive a request to recover a user private key, and a processor configured to provide a request to a credential issuing authority for a first encrypted recovery key share, wherein the request includes a first identification credential, receive the first encrypted recovery key share from the credential issuing authority, provide a request to a trusted organization for a second encrypted recovery key share, wherein the request includes a second identification credential, receive the second encrypted recovery key share from the trusted organization, combine the first encrypted recovery key share and the second encrypted recovery key share to determine a recovered encryption key, and determine the user private key using the recovered encryption key and the encrypted backup copy of user private key.

User system 102 additionally comprises a system for key storage, comprising an interface configured to receive an indication to create a credential issuing authority encrypted recovery encryption key share and a trusted organization encrypted recovery encryption key share, and a processor configured to create two recovery encryption key shares based at least in part on a recovery encryption key, determine a credential issuing authority public key associated with a credential issuing authority, encrypt a first recovery encryption key share using the credential issuing authority public key to generate a credential issuing authority encrypted recovery encryption key share, provide the credential issuing authority encrypted recovery encryption key share to the credential issuing authority, determine a trusted organization and an associated trusted organization public key, encrypt a second recovery encryption key share using the trusted organization public key to generate a trusted organization encrypted recovery encryption key share, and provide the trusted organization encrypted recovery encryption key share to the trusted organization.

Human resources system 104 comprises an employer human resources computing system associated with an employer of the user of user system 102. In some embodiments, human resources system 104 comprises a trusted organization for user system 102. Human resources system 104 is shown in FIG. 1 for illustrative purposes. In other environments, other types or additional types of systems (e.g., financial analysis systems, procurement systems, business intelligence systems, medical resource systems, etc.) may be used. Identity verification system 106 comprises an identity verification system for verifying a user identity (e.g., based on a user image and/or a user identification image) and associated the user identity with a user identity document. In some embodiments, identity verification system provides an identity validation service accessible by other system components. Credential issuing authority 108 comprises a system for issuing credentials. For example, credential issuing authority receives an indication from a database system (e.g., a university database system, an employer database system, a medical insurance database system) to provide a credential for a user, creates, and provides the credential. Credentials are stored locally on a user system (e.g., user system 102) or on credential issuing authority 108 and accessed using a user private key. Decentralized ledger 110 comprises a decentralized ledger for decentralized identity management, storing decentralized identifiers associated with entities.

Figure 2:
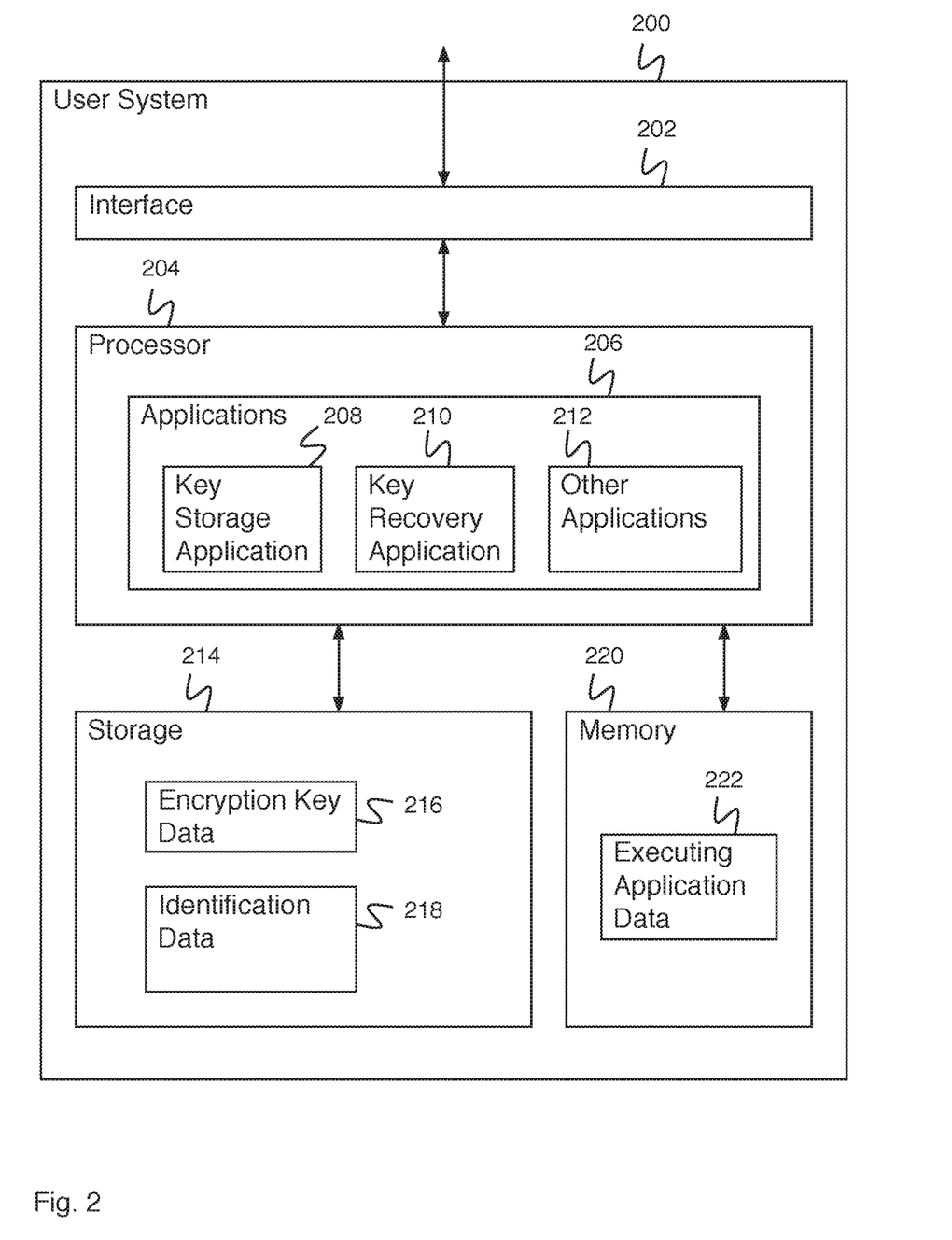
FIG. 2 is a block diagram illustrating an embodiment of a user system.

FIG. 2 is a block diagram illustrating an embodiment of a user system. In some embodiments, user system 200 comprises user system 102 of FIG. 1. In the example shown, user system 200 comprises interface 202. For example, interface 202 comprises an interface for receiving data, providing data, receiving a request for data, receiving a request to recover a user private key, receiving an indication to create a credential issuing authority encrypted recovery encryption key share and a trusted organization encrypted recovery encryption key share, etc. Processor 204 comprises a processor for executing applications 206. Applications 206 comprises key storage application 208, key recovery application 210, and other applications 212. For example, key storage application 208 comprises an application configured to create two recovery encryption key shares based at least in part on a recovery encryption key, determine a credential issuing authority public key associated with a credential issuing authority, encrypt a first recovery encryption key share using the credential issuing authority public key to generate a credential issuing authority encrypted recovery encryption key share, provide the credential issuing authority encrypted recovery encryption key share to the credential issuing authority, determine a trusted organization and an associated trusted organization public key, encrypt a second recovery encryption key share using the trusted organization public key to generate a trusted organization encrypted recovery encryption key share, and provide the trusted organization encrypted recovery encryption key share to the trusted organization. For example, key recovery application 210 comprises an application configured to provide a request to a credential issuing authority for a first encrypted recovery key share, wherein the request includes a first identification credential, receive the first encrypted recovery key share from the credential issuing authority, provide a request to a trusted organization for a second encrypted recovery key share, wherein the request includes a second identification credential, receive the second encrypted recovery key share from the trusted organization, combine the first encrypted recovery key share and the second encrypted recovery key share to determine a recovered encryption key, and determine the user private key using the recovered encryption key and the encrypted backup copy of user private key. In some embodiments, the second identification credential comprises the same identification credential as was passed to the credential issuing authority. Other applications 212 comprise any other appropriate applications (e.g., a communications application, a chat application, a web browser application, a document preparation application, a report preparation application, a user interface application, a data analysis application, etc.). Storage 214 comprises encryption key data 216 (e.g., a private encryption key, a public encryption key, a recovery encryption key, a local encryption key, an identifier document key, etc.) and identification data 218 (e.g., an identifier document, an identification image, a user image, etc.). Memory 222 comprises executing application data 224 comprising data associated with applications 206.

Figure 3:
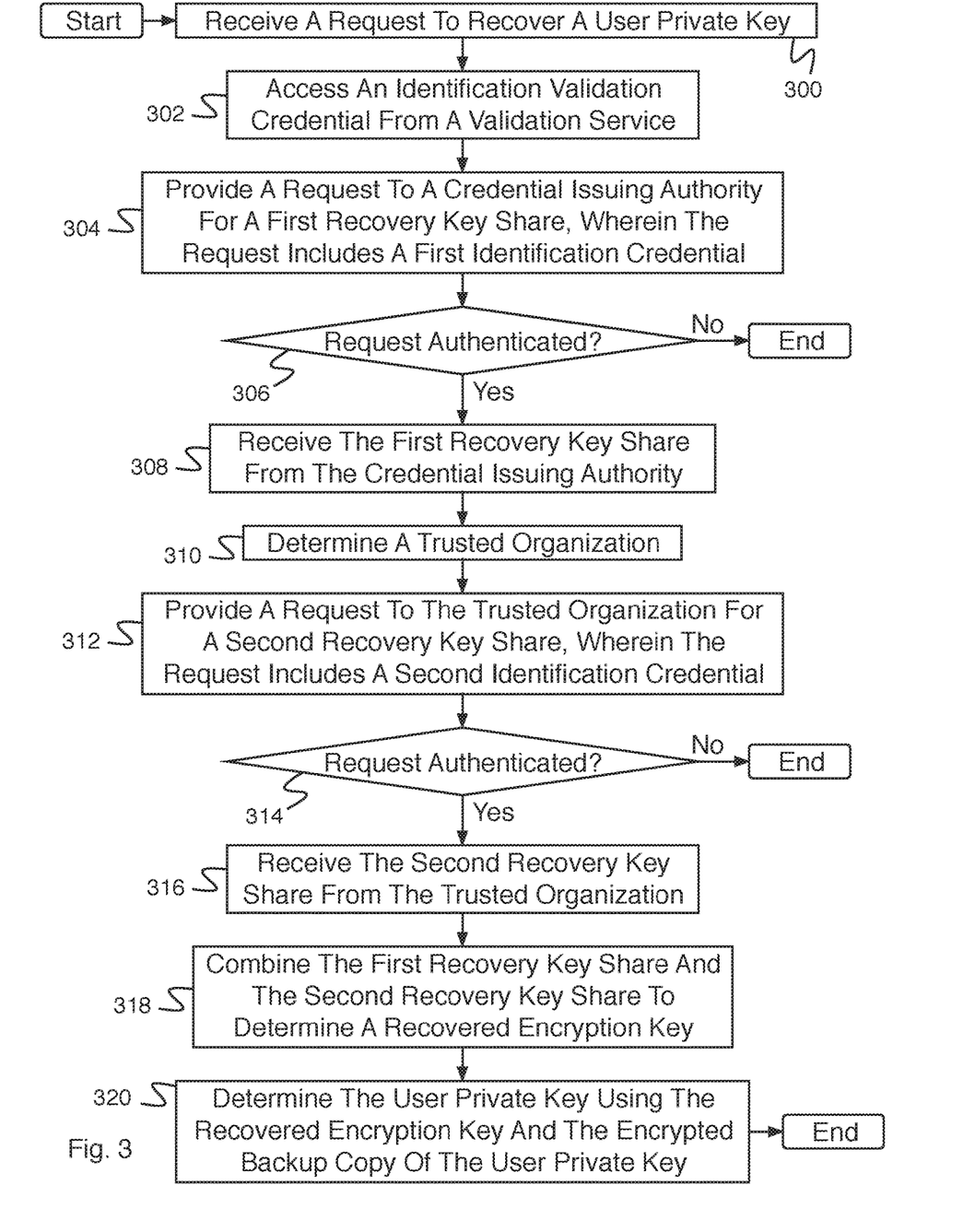
FIG. 3 is a flow diagram illustrating an embodiment of a process for recovering a user private key.

FIG. 3 is a flow diagram illustrating an embodiment of a process for recovering a user private key. In some embodiments, the process of FIG. 3 is executed by user system 102 of FIG. 1. For example, user system 102 executes the process of FIG. 3 in the event a user private key is lost. In the example shown, in 300, a request to recover a user private key is received. For example, user using a user system provides a request to recover a user private key. In some embodiments, the request to recover a user private key is associated with an email address. In 302, an identification validation credential is accessed from a validation service. For example, an identification validation credential is accessed from a validation service as executed on an identity verification system (e.g., identity verification system 106 of FIG. 1). In 304, a request is provided to a credential issuing authority for a first recovery key share, wherein the request includes a first identification credential. For example, the first identification credential comprises the identification validation credential, a password, an identity challenge, etc. In 306, it is determined whether the request is authenticated. In the event it is determined that the request is not authenticated, the process ends. In the event it is determined that the request is authenticated, control passes to 308. In 308, the first recovery key share is received from the credential issuing authority. In 310, a trusted organization is determined. For example, the trusted organization comprises a human resources management system, an employer system, a university, a medical database system, etc. In some embodiments, the trusted organization is determined by querying the credential issuing authority using an identification validation credential. In 312, a request is provided to the trusted organization for a second recovery key share, wherein the request includes a second identification credential. For example, the second identification credential comprises one or more of the following: the identification validation credential, a password, a human resources system knowledge challenge, a last two digits of a last two paychecks, a most recent performance rating, a number of coworkers on a team, etc. In some embodiments, the second identification credential comprises the same identification credential as was passed to the credential issuing authority. In some embodiments, the second identification credential comprising a knowledge based identifier that is in addition to the primary identification credential that was sent to the credential issuing authority. In 314, it is determined whether the request is authenticated. In the event it is determined that the request is not authenticated, the process ends. In the event it is determined that the request is authenticated, control passes to 316. In 316, the second recovery key share is received from the trusted organization. In 318, the first recovery key share and the second recovery key share are combined to determine a recovered encryption key. In 320, a user private key is determined using the recovered encryption key and the encrypted backup copy of the user private key. For example, the user private key is determined using the recovered encryption key from combining the shares and the encrypted backup copy of the user private key, wherein the encrypted backup copy of the user private key is fetched by the user system from a Credential Issuing Authority.

Figure 4:
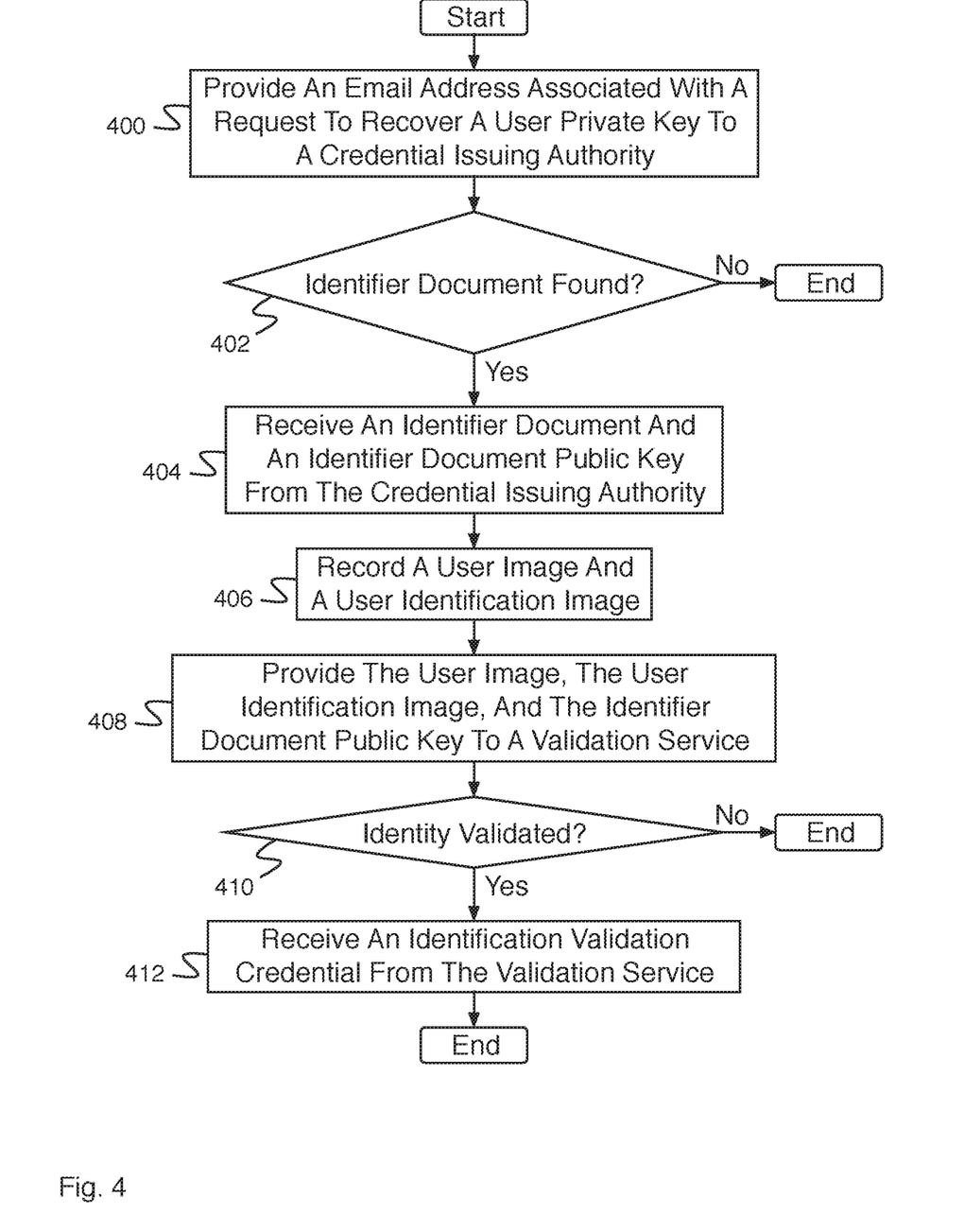
FIG. 4 is a flow diagram illustrating an embodiment of a process for accessing an identification validation credential from a validation service.

FIG. 4 is a flow diagram illustrating an embodiment of a process for accessing an identification validation credential from a validation service. In some embodiments, the process of FIG. 4 implements 302 of FIG. 3. In the example shown, in 400, an email address associated with a request to recover a user private key is provided to a credential issuing authority. In 402, it is determined whether an identifier document is found. For example, it is determined whether the credential issuing authority has found an identifier document associated with the email address in a decentralized ledger. In the event it is determined that an identifier document is not found, the process ends. In the event it is determined that an identifier document is found, control passes to 404. In 404, an identifier document and an identifier document public key are received from the credential issuing authority. In 406, a user image and a user identification image are recorded (e.g., with a user system camera). In 408, the user image, the user identification image, and the identifier document public key are provided to a validation service. In 410, it is determined whether the user identity is validated (e.g., whether the validation service is able to associate the user image, the user identification image, and the identifier document public key with a valid user). In the event it is determined that the identity is not validated, the process ends. In the event it is determined that the identity is validated, control passes to 412. In 412, an identification validation credential is received from the validation service.

Figure 5:
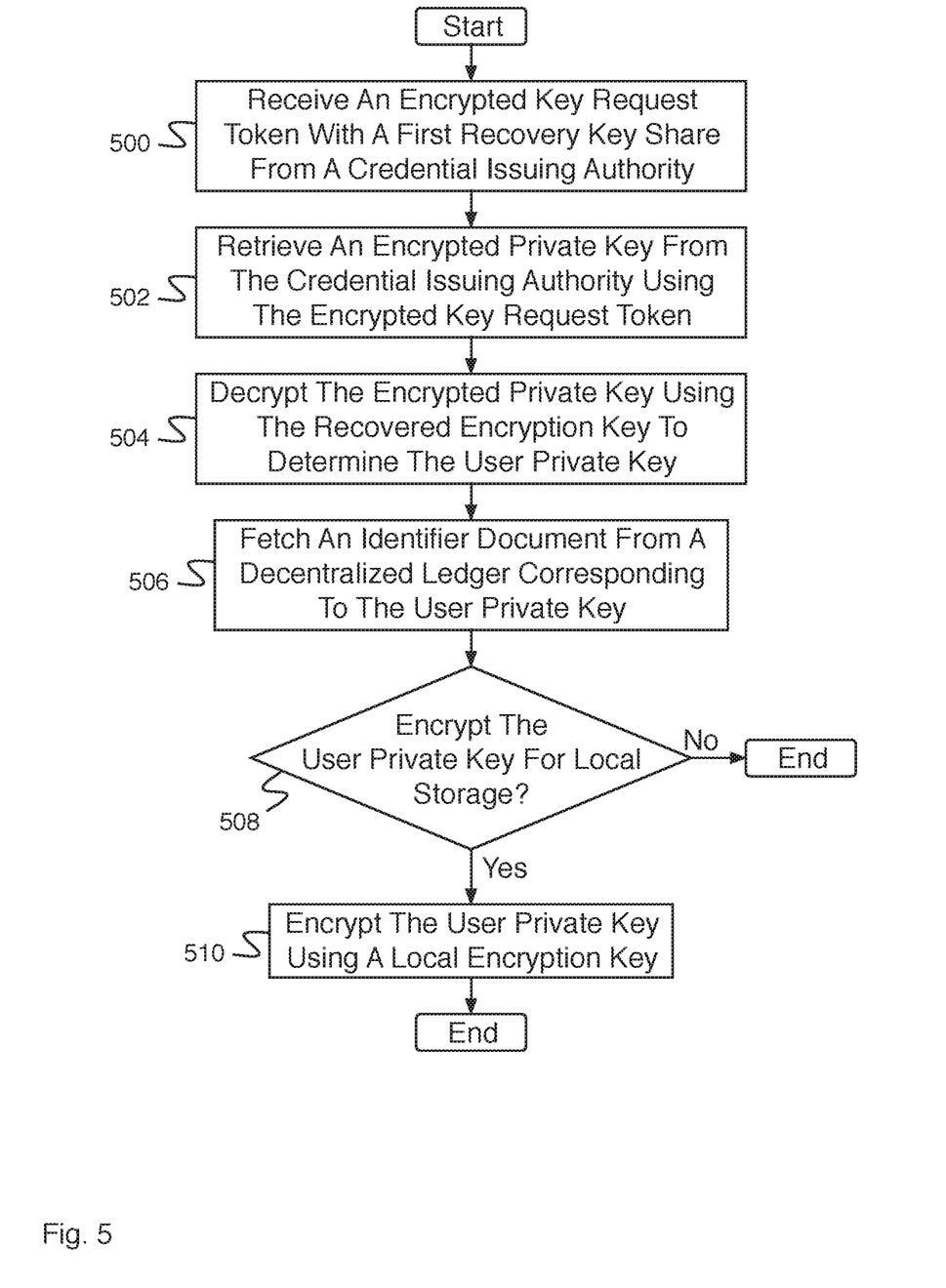
FIG. 5 is a flow diagram illustrating an embodiment of a process for determining a user private key using a recovered encryption key.

FIG. 5 is a flow diagram illustrating an embodiment of a process for determining a user private key using a recovered encryption key. In some embodiments, the process of FIG. 5 implements 320 of FIG. 3. In the example shown, in 500, an encrypted key request token is received with a first key share from a credential issuing authority. For example, the encrypted key request token comprises a JSON web token. In 502, an encrypted private key is retrieved from the credential issuing authority using the encrypted key request token. In 504, the encrypted private key is decrypted using the recovered encryption key to determine the user private key. In 506, an identifier document is fetched from a decentralized ledger corresponding to the user private key. In 508, it is determined whether to encrypt the user private key for local storage. In the event it is determined that the user private key should not be encrypted for local storage, the process ends. In the event it is determined that the user private key should be encrypted for local storage control passes to 510. In 510, the user private key is encrypted using a local encryption key.

Figure 6:
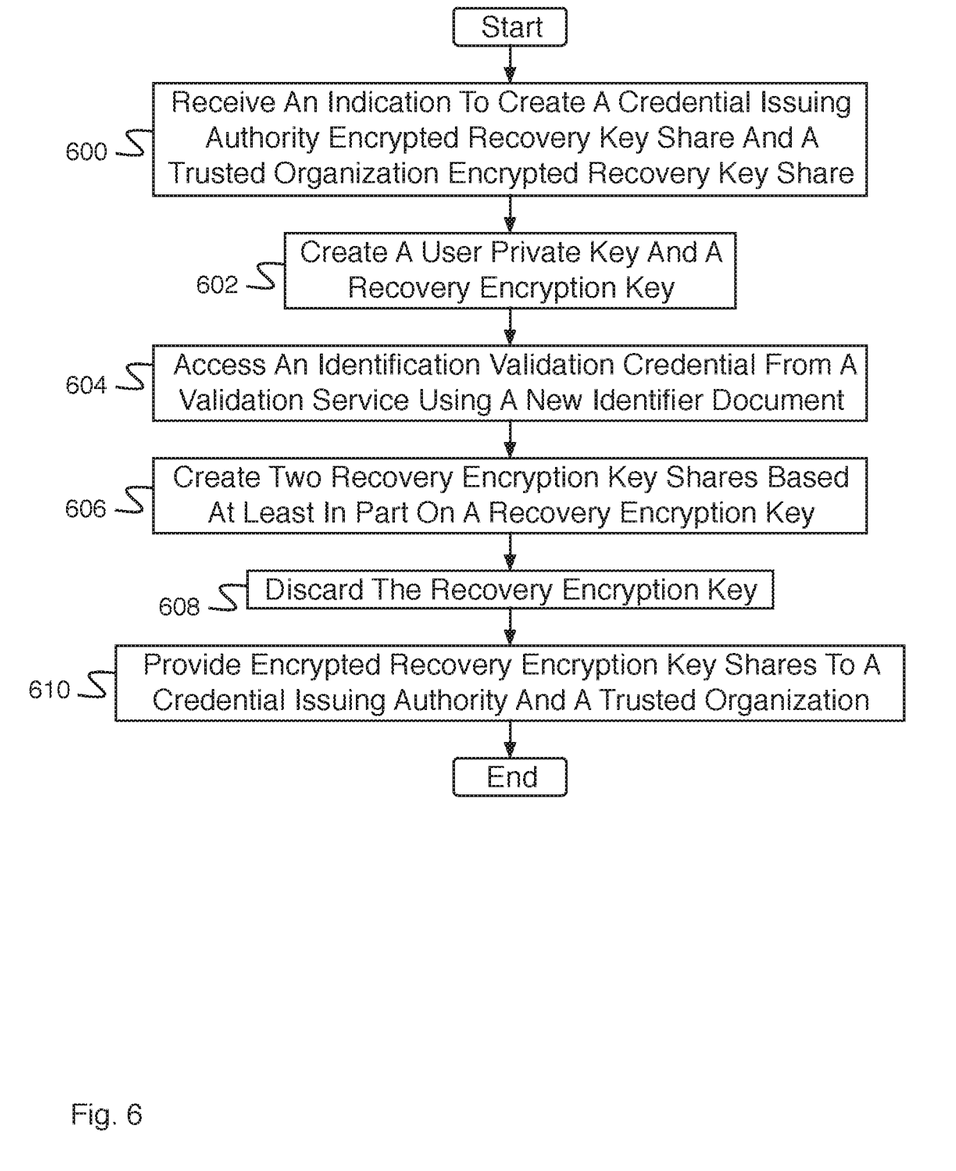
FIG. 6 is a flow diagram illustrating an embodiment of a process for key storage.

FIG. 6 is a flow diagram illustrating an embodiment of a process for key storage. In some embodiments, the process of FIG. 6 is executed by user system 102 of FIG. 1. In the example shown, in 600, an indication to create a credential issuing authority encrypted recovery key share and a trusted organization encrypted recovery key share is received. In 602, a user private key and a recovery encryption key are created. For example, two recovery encryption key shares are created based at least in part on a recovery encryption key. In 604, an identification validation credential is accessed from a validation service using a new identifier document. In 606, two recovery encryption key shares are created based at least in part on a recovery encryption key. In 608, the recovery encryption key is discarded. In 610, encrypted recovery key shares are provided to a credential issuing authority and a trusted organization.

In some embodiments, the system and method for key storage is the combination of the split key for recovery plus the remote storage of the thing to be recovered, e.g., the encrypted backup user private key stored by the credential issuing authority. The system includes an interface and a processor. The interface is configured to receive an indication to create a credential issuing authority encrypted recovery encryption key share and a trusted organization encrypted recovery encryption key share. The processor is configured to create two recovery encryption key shares based at least in part on a recovery encryption key; determine a credential issuing authority public key associated with a credential issuing authority; encrypt a first recovery encryption key share using the credential issuing authority public key to generate a credential issuing authority encrypted recovery encryption key share; provide the credential issuing authority encrypted recovery encryption key share to the credential issuing authority; determine a trusted organization and an associated trusted organization public key; encrypt a second recovery encryption key share using the trusted organization public key to generate a trusted organization encrypted recovery encryption key share; and provide the trusted organization encrypted recovery encryption key share to the trusted organization. In some embodiments, the processor is further configured to create a user private key. In some embodiments, the processor is further configured to create an identifier document. the processor is further configured to sign the identifier document with the user private key. In some embodiments, the processor is further configured to provide the signed identifier document to a decentralized ledger. In some embodiments, the processor is further configured to associate the identifier document with an email address. In some embodiments, the processor is further configured to record a user image and a user identification image. In some embodiments, the processor is further configured to provide the user image, the user identification image, and an identifier document that contains an identifier document public key to a validation service. In some embodiments, the processor is further configured to receive an identification validation credential signed with a user private key of an ID verification service from the validation service. In some embodiments, the processor is further configured to sign the identification validation credential with the user private key. In some embodiments, the processor is further configured to provide the signed identification validation credential to the credential issuing authority. In some embodiments, the processor is further configured to provide the signed identification validation credential to the trusted organization. In some embodiments, the processor is further configured to create the recovery encryption key. In some embodiments, the processor is further configured to encrypt the user private key using the recovery encryption key to create an encrypted private key. In some embodiments, the processor is further configured to provide the encrypted private key to the credential issuing authority. In some embodiments, the processor is further configured to discard the recovery encryption key after creating the two recovery encryption key shares. In some embodiments, the processor is further configured to determine the trusted organization. In some embodiments, the trusted organization is determined by querying the credential issuing authority using an identification validation credential. In some embodiments, the trusted organization comprises an employer human resources management system.

Figure 7:
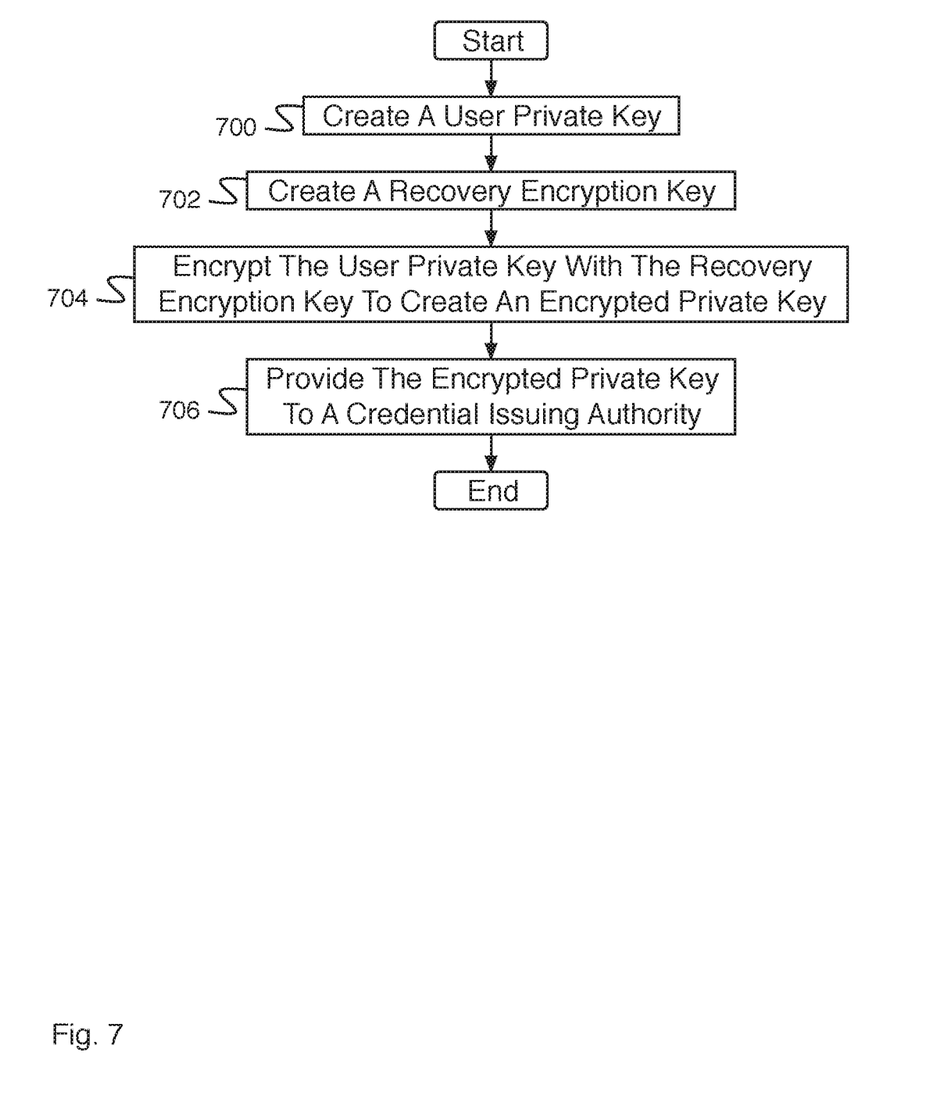
FIG. 7 is a flow diagram illustrating an embodiment of a process for creating a user private key and a recovery key.

FIG. 7 is a flow diagram illustrating an embodiment of a process for creating a user private key and a recovery key. In some embodiments, the process of FIG. 7 implements 602 of FIG. 6. In the example shown, in 700, a user private key is created. In 702, a recovery encryption key is created. In 704, the user private key is encrypted with the recovery encryption key to create an encrypted private key. In 706, the encrypted private key is provided to a credential issuing authority.

Figure 8:
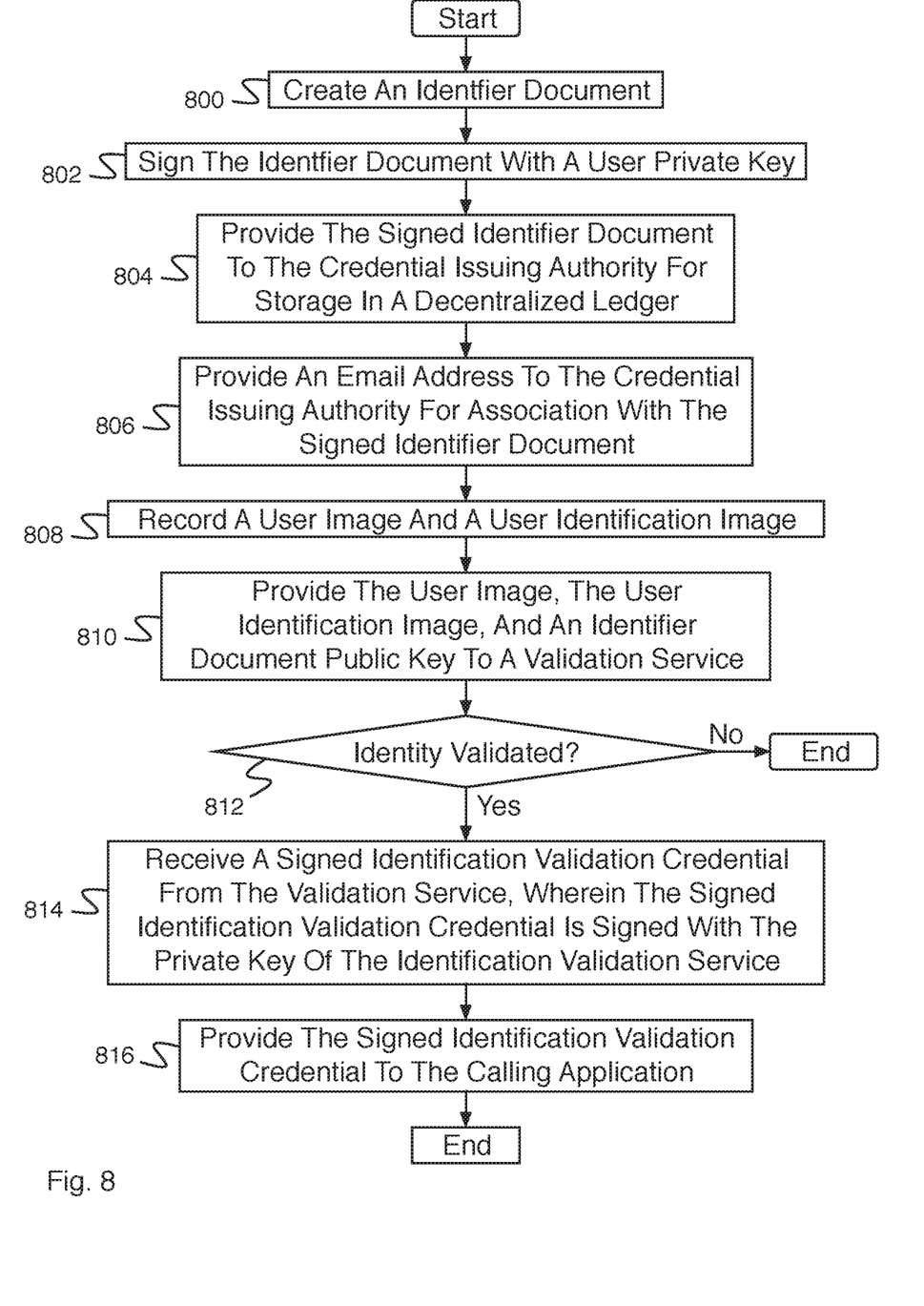
FIG. 8 is a flow diagram illustrating an embodiment of a process for accessing an identification validation credential from a validation service using a new identifier document.

FIG. 8 is a flow diagram illustrating an embodiment of a process for accessing an identification validation credential from a validation service using a new identifier document. In some embodiments, the process of FIG. 8 implements 604 of FIG. 6. In the example shown, in 800, an identifier document is created. In 802, the identifier document is signed with a user private key. In 804, the signed identifier document is provided to the credential issuing authority for storage in a decentralized ledger. In 806, an email address is provided to the credential issuing authority for association with the signed identifier document. In 808, a user image and a user identification image are recorded. In 810, the user image, the user identification image, and an identifier document public key are provided to a validation service. In 812, it is determined whether the identity is validated. In the event it is determined that the identity is not validated, the process ends. In the event it is determined that the identity is validated, control passes to 814. In 814, an identification validation credential is received from the validation service. In 814, a signed identification validation credential is received from the validation service, wherein the signed identification validation credential is signed with the private key of the identification validation service. For example, the identity validation service signs a credential with the validation service private key that attests that a valid identity was presented to it. In 816, the signed identification validation credential is provided to the calling application. For example, the signed identification validation credential is returned to the end user via the calling application.

Figure 9:
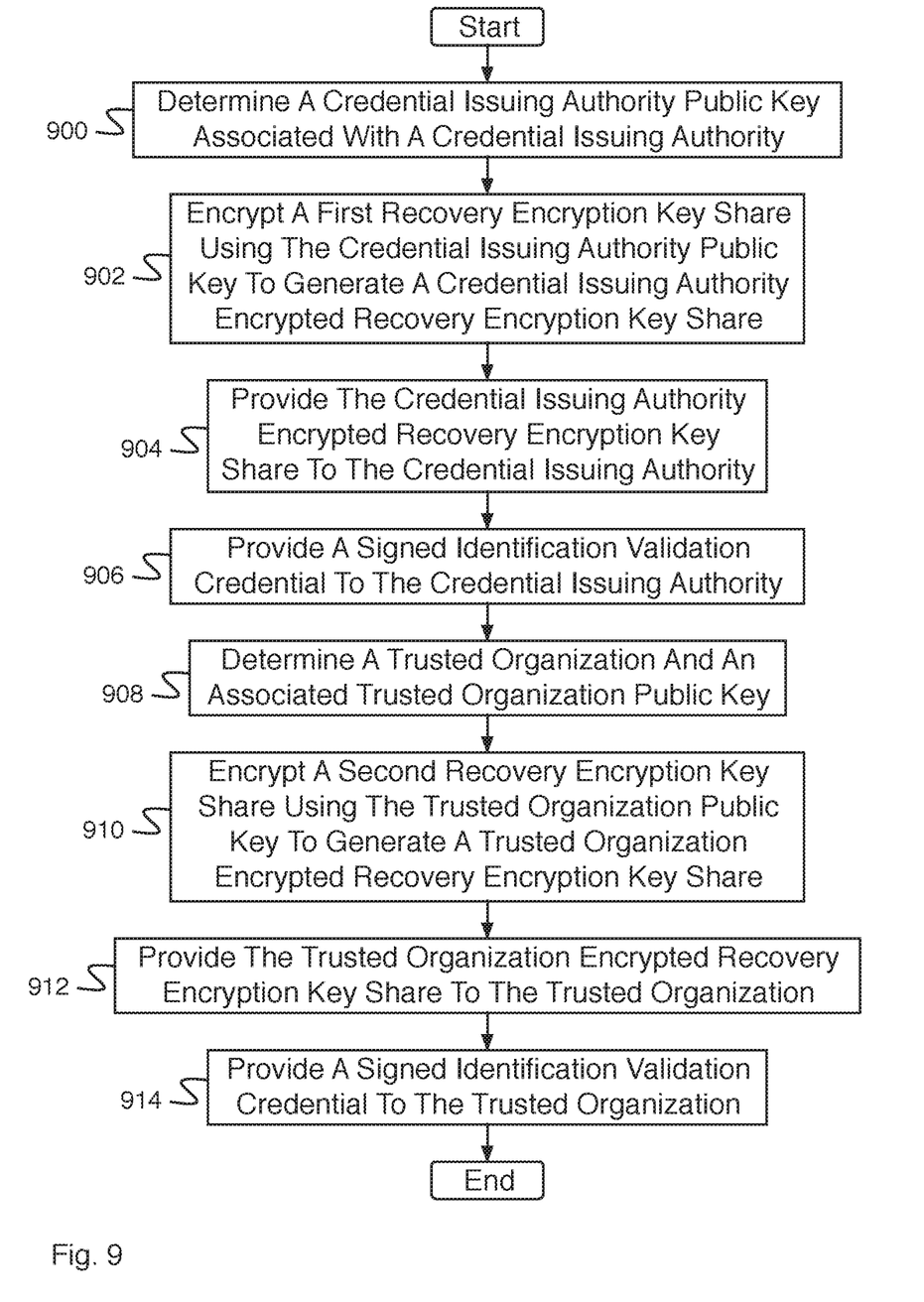
FIG. 9 is a flow diagram illustrating an embodiment of a process for providing encrypted recovery encryption key shares to a credential issuing authority and a trusted organization.

FIG. 9 is a flow diagram illustrating an embodiment of a process for providing encrypted recovery encryption key shares to a credential issuing authority and a trusted organization. In some embodiments, the process of FIG. 9 implements 610 of FIG. 6. In the example shown, in 900, a credential issuing authority public key associated with a credential issuing authority is determined. In 902, a first recovery encryption key share is encrypted using the credential issuing authority public key to generate a credential issuing authority encrypted recovery encryption key share. In 904, the credential issuing authority encrypted recovery encryption key share is provided to the credential issuing authority. In 906, a signed identification validation credential is provided to the credential issuing authority.

In 908, a trusted organization and a trusted organization public key are determined. For example, the trusted organization comprises a human resources management system, an employer system, a university, a medical database system, etc. In some embodiments, the trusted organization is determined by querying the credential issuing authority using an identification validation credential. In 910, a second recovery encryption key share is encrypted using the trusted organization public key to generate a trusted organization encrypted recovery encryption key share. In 912, the trusted organization encrypted recovery encryption key share is provided to the trusted organization. In 914, a signed identification validation credential is provided to the trusted organization. In some embodiments, the signed identification validation credential is provided so that it can be used for future verification during the recovery process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for key recovery, comprising:
an interface configured to:
  receive a request to recover a user private key; and
a processor configured to:
  provide a request to a credential issuing authority for a first recovery key share, wherein the request includes a first identification validation credential, and wherein the first recovery key share is encrypted using a credential issuing authority public key associated with the credential issuing authority and is provided to the credential issuing authority;
  query the credential issuing authority for a determination of a trusted organization using the first identification validation credential;
  receive the first recovery key share and an encrypted key request token from the credential issuing authority;
  provide a request to the trusted organization for a second recovery key share, wherein the request includes a second identification validation credential, and wherein the second recovery key share is encrypted using a trusted organization public key associated with the trusted organization and is provided to the trusted organization;
  receive the second recovery key share from the trusted organization;
  combine the first recovery key share and the second recovery key share to determine a recovered encryption key;
  provide to the credential issuing authority the encrypted key request token and a request for an encrypted backup copy of the user private key;
  receive the encrypted backup copy of the user private key from the credential issuing authority; and determine the user private key using the recovered encryption key and the encrypted backup copy of the user private key.

2. The system of claim 1, wherein the request to recover the user private key is associated with an email address.

3. The system of claim 1, wherein the processor is further configured to record a user image and a user identification image.

4. The system of claim 1, wherein the first identification credential and the second identification credential comprise one or more of the following: a password, a human resources system knowledge challenge, a last two digits of a last two paychecks, a most recent performance rating, and a number of coworkers on a team.

5. The system of claim 1, wherein the trusted organization comprises an employer human resources management system.

6. The system of claim 1, wherein the processor is further configured to encrypt the user private key for local storage using a local encryption key.

7. The system of claim 1, wherein the processor is further configured to retrieve an identifier document from a decentralized ledger corresponding to the user private key.

8. The system of claim 1, wherein the processor is further configured to receive a response to the query comprising the determination of the trusted organization from the credential issuing authority.

9. A method for key recovery, comprising:
receiving a request to recover a user private key;
providing, using a processor, a request to a credential issuing authority for a first recovery key share, wherein the request includes a first identification validation credential, and wherein the first recovery key share is encrypted using a credential issuing authority public key associated with the credential issuing authority and is provided to the credential issuing authority;
querying the credential issuing authority for a determination of a trusted organization using the first identification validation credential;
receiving the first recovery key share and an encrypted key request token from the credential issuing authority;
providing a request to the trusted organization for a second recovery key share, wherein the request includes a second identification validation credential, and wherein the second recovery key share is encrypted using a trusted organization public key associated with the trusted organization and is provided to the trusted organization;
receiving the second recovery key share from the trusted organization;
combining the first recovery key share and the second recovery key share to determine a recovered encryption key;
providing to the credential issuing authority the encrypted key request token and a request for an encrypted backup copy of the user private key;
receiving the encrypted backup copy of the user private key from the credential issuing authority; and
determining the user private key using the recovered encryption key and the encrypted backup copy of the user private key.

10. A system for key storage, comprising:
an interface configured to:
receive an indication to create a credential issuing authority encrypted recovery encryption key share and a trusted organization encrypted recovery encryption key share; and
a processor configured to:
create two recovery encryption key shares based at least in part on a recovery encryption key;
determine a credential issuing authority public key associated with a credential issuing authority;
encrypt a first recovery encryption key share using the credential issuing authority public key to generate a credential issuing authority encrypted recovery encryption key share, wherein the credential issuing authority public key is associated with the credential issuing authority;
provide the credential issuing authority encrypted recovery encryption key share to the credential issuing authority;
query the credential issuing authority for a determination of a trusted organization using the first identification validation credential;
encrypt a second recovery encryption key share using the trusted organization public key to generate a trusted organization encrypted recovery encryption key share, wherein the trusted organization public key is associated with the trusted organization; and
provide the trusted organization encrypted recovery encryption key share to the trusted organization, and
create a user private key, comprising to:
provide to the credential issuing authority an encrypted key request token and a request for an encrypted backup copy of the user private key, wherein the encrypted key request token is received from the credential issuing authority;
receive the encrypted backup copy of the user private key from the credential issuing authority; and
determine the user private key using a recovered encryption key and the encrypted backup copy of the user private key.

11. The system of claim 10, wherein the processor is further configured to record a user image and a user identification image.

12. The system of claim 10, wherein the processor is further configured to create the recovery encryption key.

13. The system of claim 12, wherein the processor is further configured to encrypt the user private key using the recovery encryption key to create an encrypted private key.

14. The system of claim 13, wherein the processor is further configured to provide the encrypted private key to the credential issuing authority.

15. The system of claim 10, wherein the processor is further configured to discard the recovery encryption key after creating the two recovery encryption key shares.

16. The system of claim 10, wherein the processor is further configured to encrypt the user private key for local storage using a local encryption key.

17. A method for key storage, comprising:
receiving an indication to create a credential issuing authority encrypted recovery encryption key share and a trusted organization encrypted recovery encryption key share;
creating, using a processor, two recovery encryption key shares based at least in part on a recovery encryption key;
determining a credential issuing authority public key associated with a credential issuing authority;
encrypting a first recovery encryption key share using the credential issuing authority public key to generate a credential issuing authority encrypted recovery encryption key share, wherein the credential issuing authority public key is associated with the credential issuing authority;

providing the credential issuing authority encrypted recovery encryption key share to the credential issuing authority;

querying the credential issuing authority for a determination of a trusted organization using an identification validation credential;

encrypt a second recovery encryption key share using the trusted organization public key to generate a trusted organization encrypted recovery encryption key share, wherein the trusted organization public key is associated with the trusted organization; and providing the trusted organization encrypted recovery encryption key share to the trusted organization, and creating a user private key, comprising:
   providing to the credential issuing authority an encrypted key request token and a request for an encrypted backup copy of the user private key, wherein the encrypted key request token is received from the credential issuing authority;
   receiving the encrypted backup copy of the user private key from the credential issuing authority; and
   determining the user private key using a recovered encryption key and the encrypted backup copy of the user private key.

\* \* \* \* \*